(12) United States Patent
Piucci, Jr. et al.

(10) Patent No.: US 8,434,536 B2
(45) Date of Patent: May 7, 2013

(54) HEAT-SEAL SYSTEM AND METHOD

(75) Inventors: Vincent A. Piucci, Jr., Southbridge, MA (US); Michael J. Schamel, Wilmont, NH (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 0 days.

(21) Appl. No.: 13/313,494

(22) Filed: Dec. 7, 2011

(65) Prior Publication Data

US 2012/0080133 A1    Apr. 5, 2012

Related U.S. Application Data

(63) Continuation of application No. 12/655,856, filed on Jan. 8, 2010.

(51) Int. Cl.
*B32B 37/08* (2006.01)
(52) U.S. Cl.
USPC .......... 156/378; 156/64; 156/290; 156/308.2; 156/308.4; 156/322; 156/350; 156/359; 156/367; 156/379; 156/379.6; 156/580; 156/581; 156/583.1; 156/583.7; 156/583.9
(58) Field of Classification Search .............. 156/64, 156/290, 308.2, 308.4, 322, 350, 359, 367, 156/378, 379, 379.6, 580, 581, 583.1, 583.7, 156/583.9
See application file for complete search history.

(56) References Cited

U.S. PATENT DOCUMENTS

| | | | |
|---|---|---|---|
| 2,596,933 A | 5/1952 | Kirk | |
| 2,725,091 A | 11/1955 | Miner et al. | |
| 2,766,365 A | 10/1956 | Winstead | |
| 3,488,244 A | 1/1970 | Lepisto | |
| 3,516,887 A | 6/1970 | Jones | |
| 4,288,968 A | 9/1981 | Seko et al. | |
| 4,462,020 A | 7/1984 | May | |
| 4,761,197 A | 8/1988 | Christine et al. | |
| 4,800,708 A | 1/1989 | Sperry | |
| 4,854,109 A | 8/1989 | Pinarer et al. | |
| 5,027,583 A | 7/1991 | Chelak | |
| 5,277,745 A * | 1/1994 | Williams | 156/583.1 |
| 5,376,219 A | 12/1994 | Sperry et al. | |
| 5,403,427 A | 4/1995 | Wilcox | |
| 6,003,288 A | 12/1999 | Sperry et al. | |
| 6,425,848 B2 | 7/2002 | Bell et al. | |
| 6,472,638 B1 | 10/2002 | Sperry et al. | |
| 6,550,229 B2 | 4/2003 | Sperry et al. | |
| 6,598,373 B2 | 7/2003 | Sperry et al. | |
| 6,656,310 B2 | 12/2003 | Basque | |
| 6,675,557 B2 | 1/2004 | Sperry et al. | |
| 6,719,863 B2 | 4/2004 | Basque | |
| 6,917,014 B2 | 7/2005 | Makutonin et al. | |

(Continued)

FOREIGN PATENT DOCUMENTS
JP        2003 068431 A    3/2003

*Primary Examiner* — Katarzyna Wyrozebski Lee
*Assistant Examiner* — Joshel Rivera
(74) *Attorney, Agent, or Firm* — Thomas C. Lagaly

(57) ABSTRACT

A heat-seal device generally includes a heat source, a thermal conductor, which encapsulates at least a portion of the heat source and is capable of transferring heat from the heat source, and a thermal insulator, which substantially surrounds the thermal conductor but leaves a portion thereof exposed, the exposed portion of the thermal conductor providing a heat-seal contact surface, which is adapted to be brought into contact with a material to be sealed.

6 Claims, 9 Drawing Sheets

U.S. PATENT DOCUMENTS

| | | |
|---|---|---|
| 6,932,134 B2 | 8/2005 | Selle et al. |
| 7,219,483 B2 | 5/2007 | Adair, Jr. et al. |
| 7,220,476 B2 | 5/2007 | Sperry et al. |
| 7,225,599 B2 | 6/2007 | Sperry et al. |
| 7,607,911 B2 | 10/2009 | Sperry et al. |
| 2006/0107621 A1 | 5/2006 | James et al. |
| 2006/0107622 A1 | 5/2006 | James et al. |
| 2007/0034329 A1 | 2/2007 | Padoy |
| 2007/0068632 A1 | 3/2007 | Bertram et al. |
| 2007/0252297 A1 | 11/2007 | Sperry et al. |

* cited by examiner

HEAT-SEAL SYSTEM AND METHOD

This application is a continuation of U.S. patent application Ser. No. 12/655,856, filed Jan. 8, 2010, the disclosure of which is hereby incorporated herein by reference thereto.

BACKGROUND OF THE INVENTION

The present invention relates to a device for sealing materials such as plastic film and, more particularly, to an improved heat-sealing device having a heat-source encapsulated within a thermal conductor.

Various types of machines exist for forming containers from plastic films. In such machines, one or more heat-sealing devices are included for sealing together the plastic films in such a manner as to create and/or seal-closed the containers.

In the field of packaging, for example, many types of machines form inflated packaging cushions by inflating a flexible container, e.g. a bag, with air, and then sealing closed the inflated container. The inflatable containers may be pre-formed and arranged in series in a flexible web, with only a longitudinal closure seal being formed at the opening of the containers by the heat-sealing device, wherein "longitudinal" refers to the direction in which the web moves as it is conveyed through the machine. Alternatively, the containers may be formed from a pair of juxtaposed film plies, wherein one heat-seal device forms a longitudinal seal between juxtaposed edge regions of the films to form a closed longitudinal edge, while leaving the opposing longitudinal edge open; another heat-seal device creates transverse seals between the two film plies to form the containers, with the open longitudinal edge providing openings in the containers for inflation; and a third heat-seal device forms a longitudinal seal at the open longitudinal edge to seal-closed the openings after the containers have been inflated. Alternatively, a single film ply may be used, which is 'center-folded' in the longitudinal direction such that the fold forms the closed longitudinal edge; in this case, only one longitudinal heat-seal device is required. Examples of such machines may be found, for example, in U.S. Pat. Nos. 6,598,373, 7,220,476, and U.S. Pat. No. 7,225,599.

Another method for producing packaging cushions is known as 'foam-in-place' packaging, wherein a machine produces flexible containers, e.g., bags, from flexible, plastic film, and dispenses a foamable composition into the containers as they are being formed. As the composition expands into a foam within the container, the container is sealed shut and typically dropped into a carton, e.g., a box, which holds the object to be cushioned. The rising foam expands into the available space within the carton, but does so inside the container. Because the bags are formed of flexible plastic, they form individual custom foam cushions around the packaged objects. As part of the container-forming mechanism, a heat-seal device is generally provided for forming a longitudinal heat-seal. Exemplary types of such packaging apparatus are described, for example, in U.S. Pat. Nos. 4,800,708, 4,854,109, 5,027,583, 5,376,219, 6,003,288, 6,472,638, 6,675,557, and U.S. Pat. No. 7,607,911, and in U.S. Pub. No. 2007-0252297-A1.

While the foregoing machines for making air-filled and foam-filled packaging cushions have been widely used and commercially successful, improvement is continually sought. One particular aspect wherein improvement is desired concerns the manner in which the film plies are sealed together, especially in the longitudinal direction, i.e., the direction in which the film plies move as they are conveyed through the machine.

The inventors hereof have determined that an important factor in making good heat seals is consistency in the temperature at which heat is applied to the films during the formation of the seal. The selection of the correct temperature to be applied during heat-sealing is commonly carried out by operators of cushion-making machines through routine experimentation, e.g., by trial and error. If the temperature is too high, the heat-seal device may melt through the films without sealing them together; if the temperature is too low, no seal or an incomplete/weak seal may be formed. The correct temperature to be selected will vary from application to application, based on a number of operational factors, including the composition and thickness of the film plies to be sealed, the pressure at which the film plies and the heating device are urged together, the speed at which the film is conveyed, etc. Mathematical algorithms may also be used to select to optimum temperature, e.g., based on operator input and/or sensor input of the foregoing factors.

In addition to the selection of the proper heat-sealing temperature, a factor that is equally important to the formation of good, consistent heat seals is the ability of the heat-seal device to maintain the selected temperature during the formation of the heat seals. A number of factors can influence the temperature of the heat-seal device, including the speed at which the film is conveyed through the machine. In many packaging-cushion machines, the film is driven at varying speeds through the machine. As the film is driven faster, it has more ability to remove heat from the heat-seal device, necessitating higher wattage (electrical power) to maintain the proper temperature. Conversely, as the film drives more slowly, it does not use the heat as fast, requiring less power to make the seal. Other factors involved in determining the power necessary to make a sufficient seal include ambient temperature, latent heat build-up in the sealing components, the thickness of the film material, and the temperature of the film itself, e.g., a new roll of film may be taken from a cool storage room and installed on the machine, where it will slowly raise to ambient temperature.

While conventional packaging-cushion machines typically have means for controlling the temperature of the heat-seal device to achieve consistency, improvement is sought in order to obtain a higher degree' of precision, i.e., a lower degree of temperature variation from a selected temperature.

Another aspect of conventional heat-seal devices for which improvement is sought concerns the structure of such devices. Conventional heat-seal devices employ, as a heat-source, an electrically-resistive heating element, which generates heat upon the passage of electricity therethrough. Such heating elements are typically fully exposed, and brought into direct contact with the film to be sealed, which can result in melt-throughs of the film plies. When the heat-seal device melts through the film plies, an outer strip from one or both film plies very often separates from the rest of the film and wraps around the heat-seal device. This problem, which is known as 'ribbon cutting,' results in the necessity of shutting down the cushion-making machine and extricating the film strip from the heat-seal device. Typically, the strip is tightly wound around the device and/or partially melted such that removal of the strip is a difficult and time-consuming process. Another disadvantage of 'open-air' heating elements is that such configuration limits the service life of the heating element due to frictional contact with the film and oxidation due to exposure to the air while heated.

Therefore, the need exists for an improved heat-seal device that is suitable for forming heat-seals in packaging-cushion machines, and which avoids the foregoing disadvantages.

SUMMARY OF THE INVENTION

That need is met by the present invention, which, in one aspect, provides a heat-seal device, comprising:

a. a heat source;

b. a thermal conductor, which encapsulates at least a portion of the heat source and is capable of transferring heat from the heat source; and c. a thermal insulator, which substantially surrounds the thermal conductor but leaves a portion thereof exposed, the exposed portion of the thermal conductor providing a heat-seal contact surface, which is adapted to be brought into contact with a material to be sealed, wherein the thermal conductor has a higher degree of thermal conductivity than the thermal insulator.

Another aspect of the invention pertains to a heat-sealing method, comprising the steps of:

a. providing the heat-seal device described above;

b. causing the heat source to produce heat; and c. bringing the heat-seal contact surface into contact with a material to be sealed, whereby, the heat produced by the heat source transfers through the thermal conductor and into the material to be sealed via the contact surface.

Another aspect of the invention pertains to heat-seal device, comprising:

a. a heat source;

b. a thermal conductor, which encapsulates at least a portion of the heat source and is capable of transferring heat from the heat source via a heat-seal contact surface on the thermal conductor, wherein the contact surface is adapted to be brought into contact with a material to be sealed; and c. a temperature-measuring device, at least a portion of which is encapsulated with the heat source in the thermal conductor.

A further aspect of the invention pertains to a heat-seal system, comprising:

a. a heat-seal device, comprising 1) a heat source capable of producing heat, 2) a thermal conductor, which encapsulates at least a portion of the heat source and is capable of assuming a temperature that corresponds, at least in part, to the heat produced by the heat source, and 3) a thermal insulator, which substantially surrounds the thermal conductor but leaves a portion thereof exposed, the exposed portion of the thermal conductor providing a heat-seal contact surface, which is adapted to be brought into contact with a material to be sealed;

b. a temperature-measuring device, at least a portion of which is encapsulated with the heat source in the thermal conductor; and c. a controller in operative communication with the heat source and with the temperature-measuring device, the controller adapted to 1) receive input from the temperature-measuring device, which is indicative of the temperature of the thermal conductor, and 2) send output to the heat source, which causes the heat source to produce more heat, less heat, or an unchanged amount of heat, whereby, the controller determines the temperature of the thermal conductor.

These and other aspects and features of the invention may be better understood with reference to the following description and accompanying drawings.

DETAILED DESCRIPTION OF THE INVENTION

Figure 1:
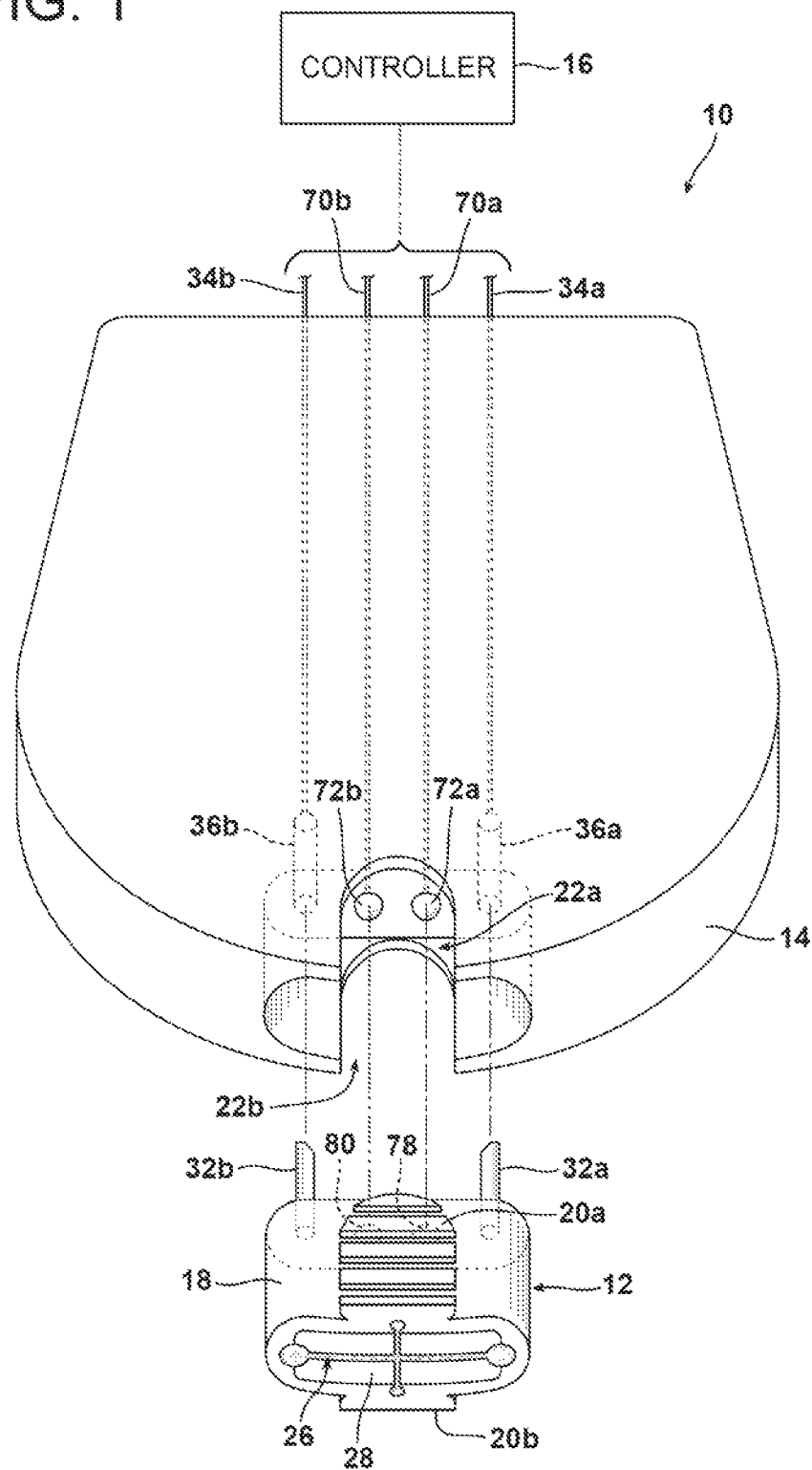
FIG. 1 is a schematic view of heat-seal system 10 in accordance with the present invention, including a heat-seal device 12 and controller 16.

FIG. 1 illustrates one embodiment of a heat-seal system 10 in accordance with the present invention. As illustrated, heat-seal system 10 may include a heat-seal device 12, a support member 14, and a controller 16. Heat-seal system 10 may be employed in any of the above-described types of machines for making packaging cushions, e.g., either air-filled cushions or foam-filled cushions, by securing the support member 14 to the machine in such a manner as to bring the heat-seal device 12 into sliding contact with the film plies to be sealed together, i.e., to form a longitudinal seal as described above.

In this embodiment, heat-seal device 12 is in the form of a replaceable cartridge, which is removably affixed to support member 14. The advantage of this embodiment is ease of maintenance and replacement of the heat-seal device 12 when necessary, without having to remove the entire support member 14 from the machine in which the heat-seal system 10 is employed. The components of the heat-seal device may thus be contained within a cartridge housing 18, with grip members 20a, b included on either side of the cartridge housing to facilitate manual grasping thereof. As shown, the grip members 20a, b may be shaped to fit within corresponding slots 22a, b in support member 14.

Figure 2:
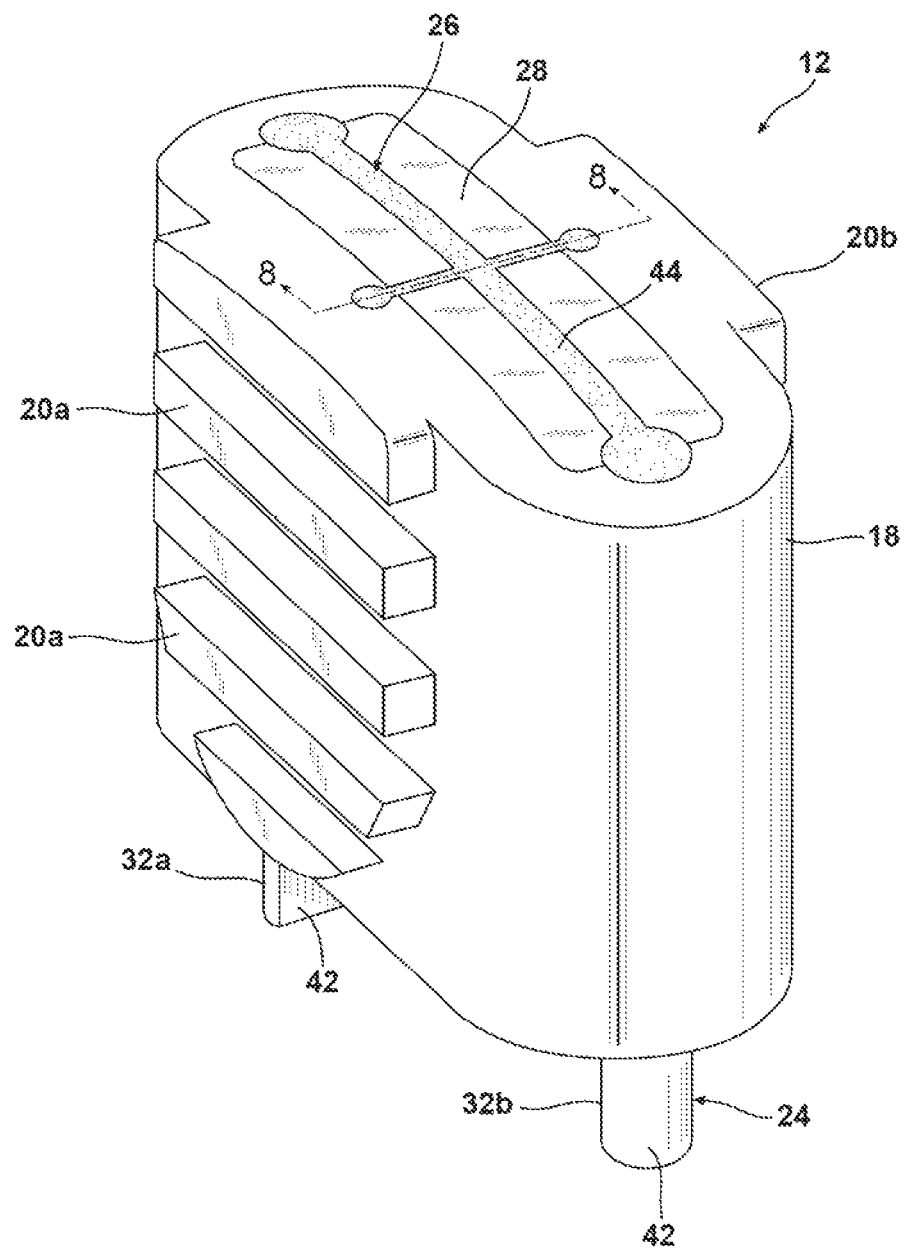
FIG. 2 is a perspective view of the heat-seal device 12 illustrated in FIG. 1, showing the top of the device.
Figure 3:
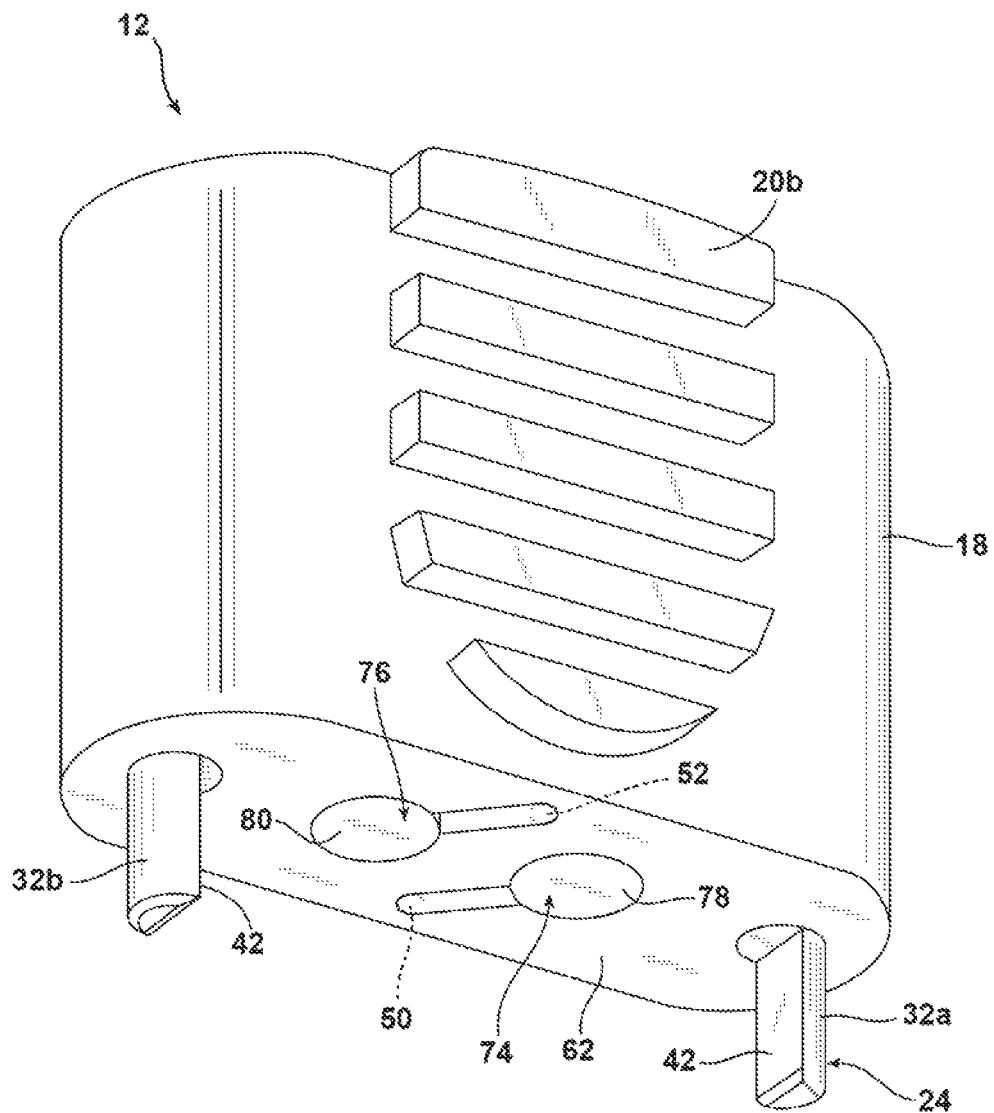
FIG. 3 is a perspective view of the heat-seal device 12 illustrated in FIG. 1, showing the bottom of the device.
Figure 4:
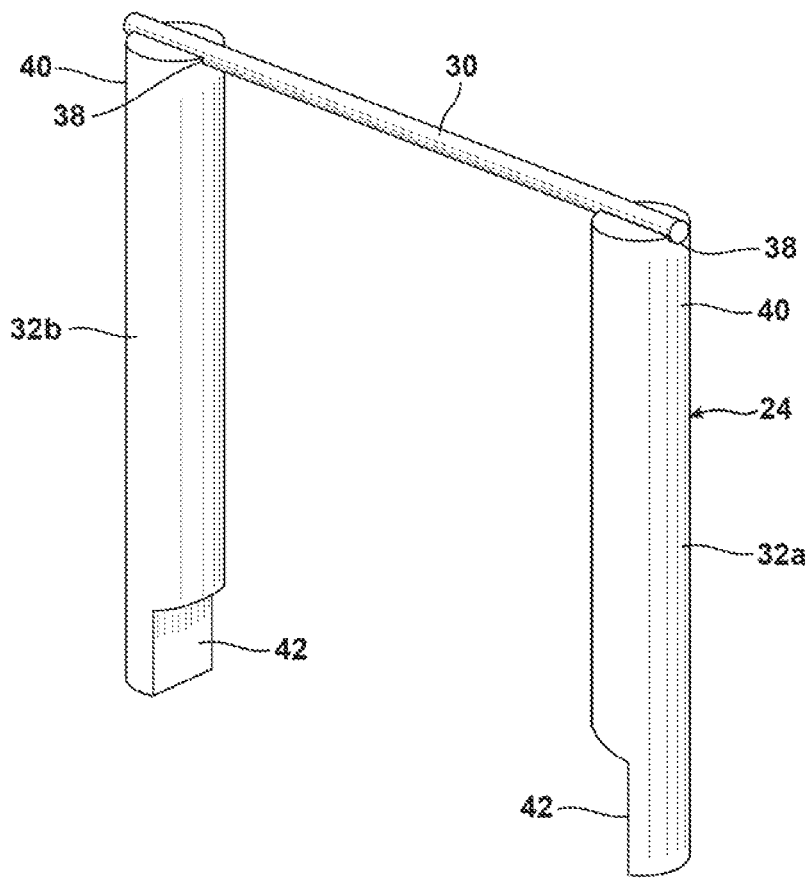
FIG. 4 is a perspective view of a heat-source 24, which is a component of heat-seal device 12.

Referring collectively to FIGS. 1-4, it may be seen that heat-seal device 12 may comprise a heat source 24, a thermal conductor 26, and a thermal insulator 28. As shown in FIG. 4, heat source 24 may comprise a heating element 30 and a pair of contact posts 32a, b, wherein the heating element 30 is in physical and electrical contact with the contact posts 32a, b. Contact posts 32a, b may extend through and out of housing 18 in such a manner as to provide electrical contact with supply and return wires 34a, b, respectively. As shown in FIG. 1, support member 14 may be configured such that supply wire 34a extends through the support member, and terminates at contact well 36a, into which contact post 32a may be inserted to make electrical contact with wire 34a. Similarly, return wire 34b may also extend through the support member 14, and terminate at contact well 36b, into which contact post 32b may be inserted to make electrical contact with wire 34b. In this manner, when wires 34a, b are connected to a source of electricity, e.g., via controller 16, electricity may be supplied to the heat source 24 when heat-seal device 12 is inserted into support member 14. As explained in further detail below, system 10 may be arranged such that controller 16 controls the amount of electricity supplied to heat source 24, and thereby controls the amount of heat generated by the heat source.

Heating element 30 may be any device capable of heating to a temperature sufficient to heat-seal, i.e., melt bond or weld, two film plies together. Such temperature, i.e., the "sealing temperature," may readily be determined by those of ordinary skill in the art, without undue experimentation, for a given application based on, e.g., the composition and thickness of the film plies to be sealed together, the pressure at which the film plies and the heating device are urged together, the speed at which the film plies are conveyed, etc., as noted above.

Suitable types of devices for heating element 30 include one or more wires, ribbons, bands, etc., comprising metal and/or other electrically conductive materials. FIG. 4 illustrates heating element 30 in the form of a wire. When heating element 30 assumes such a form, the wire may have any desired cross-sectional shape, including round, square, oval, rectangular, etc.

In a preferred embodiment of the invention, heating element 30 has a higher degree of electrical resistance than the contact posts 32a, b. In this manner, the transmission of electrical current through the heat source 24 results in the heating element 30 heating to a higher temperature than the contact posts 32a, b due to the higher resistance of the heating element. Thus, depending upon the difference in resistance between the heating element 30 and contact posts 32a, b, only the heating element 30, and not the contact posts 32a, b, may be heated to the sealing temperature. Such arrangement is advantageous in that it results in less overall heat generated by the heat source 24, and therefore less energy usage. Further, when only the heating element portion 30 of the heat source 24 is heated to the sealing temperature, the relatively small thermal mass of the heating element 30 may be heated to the sealing temperature from room temperature very quickly, usually in less than 1 second. Thus, the heat source 24 does not have to be kept warm during pauses in sealing operations by maintaining a low or "idling" current through the heat source. Instead, current is sent through the heat source 24 just prior to initiation of a sealing operation, and is then stopped immediately thereafter.

The difference in electrical resistance between the heating element 30 and the contact posts 32a, b may be accomplished by constructing heating element 30 from a material having a higher degree of electrical resistance and/or a smaller cross-section than that from which the contact posts 32a, b are constructed. Suitable materials from which heating element 30 may be constructed include nickel/chromium alloy (nichrome), cobalt/chromium/nickel alloy, copper/manganese alloy, nickel/iron alloy, copper/nickel alloy, and other metals having a relatively high degree of electrical resistance. Contact posts 32a, b may be constructed from lower-resistance materials, such as stainless steel, brass, copper and copper alloys, materials such as steal with an external cladding of copper, gold, or highly conductive metal, and other metals having a relatively low degree of electrical resistance.

Heating element 30 may be in the form of a wire having a diameter ranging from about 0.003 inch to about 0.040 inch, e.g., between about 0.005 to about 0.015 inch. Contact posts 32a, b may have diameter ranging from about 0.015 inch to about 0.125 inch, e.g., between about 0.030 to about 0.060 inch.

The heat source 24 as illustrated in FIG. 4 may be constructed by providing grooves 38 at a first end 40 of each of the contact posts 32a, b, placing the heating element 30 in such grooves, and affixing the heating element 30 to contact posts 32a, b within the grooves 38, e.g., via laser welding, electron beam welding, etc. As an alternative to grooves 38, holes may be drilled into the contact posts 32a, b near first end 40, into which opposing ends of the heating element 30 may be placed. The second ends 42 of the contact posts 32a, b may be shaped as necessary to facilitate the making of good electrical contact within contact wells 36a, b in support member 14.

Figure 8:
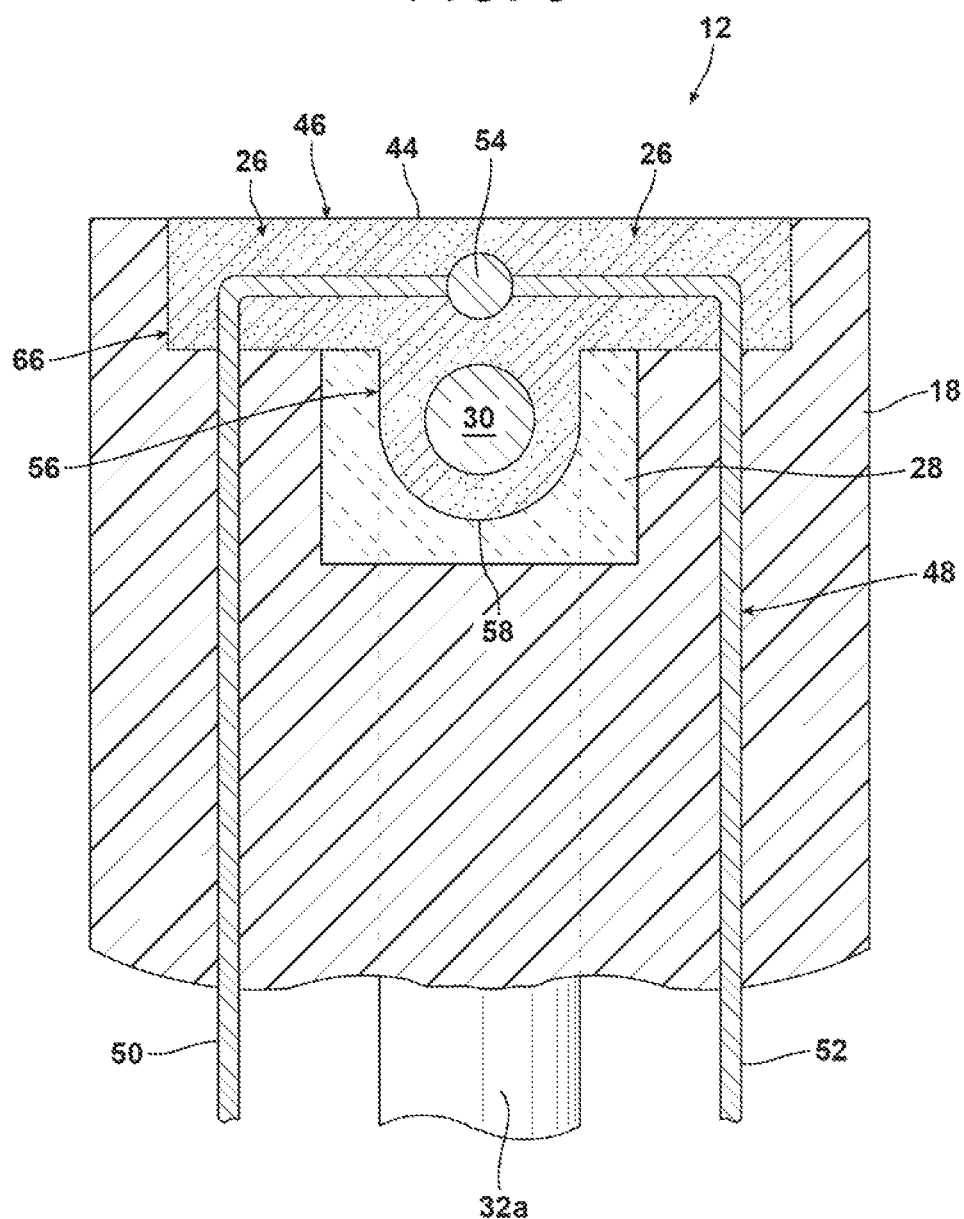
FIG. 8 is cross-sectional view of the device 12, taken along lines 8-8 in FIG. 2.

As perhaps best shown in FIGS. 2 and 8, thermal insulator 28 substantially surrounds the thermal conductor 26, but leaves a portion 44 thereof, i.e., a surface portion, exposed, wherein the exposed portion 44 provides a heat-seal contact surface. In some embodiments, the entire cartridge housing 18 may function as the thermal insulator, e.g., by being constructed from a thermally insulating material. In other embodiments, the thermal insulator 28 may be omitted altogether. In still other embodiments, cartridge housing 18 may be constructed largely from a relatively low-cost, non-insulating material, e.g., plastic, metal, etc., with a thermally-insulating sub-housing or liner in direct contact with all or most of the thermal conductor 26.

In the drawings, the latter embodiment is illustrated, wherein thermal insulator 28 is in the form of a liner or sub-housing within cartridge housing 18. As shown, thermal insulator 28 is configured such that it is substantially positioned between the thermal conductor 26 and the cartridge housing 18, thereby insulating the housing 18 from the conductor 26, particularly those portions of the conductor 26 that are adjacent to the heating element 30. In this manner, most of the heat generated by the heat source 24 will be transferred through the thermal conductor 26 and out of the conductor at surface portion 44, rather than into the cartridge housing 18. This improves the efficiency of the heat-sealing process and allows cartridge housing 18 to be constructed, e.g., from a low-cost plastic material having a melting point lower than the sealing temperature reached by the heat source 24.

With continuing reference to FIGS. 2 and 8, it may be seen that thermal conductor 26 encapsulates at least a portion of heat source 24. For example, as shown, the heating element 30 of heat source 24 may be substantially completely encapsulated by the thermal conductor 26. In this manner, the heating element 30 may be physically protected by the conductor 26, which extends the service life of the element, e.g., by preventing the heating element from coming into direct contact with the films to be sealed. Encapsulation in this manner also minimizes the exposure of the heating element to air, which thereby prevents or reduces oxidation of the heating element and further extends the service life thereof.

The thermal conductor 26 is capable of transferring heat from the heat source 24. Thus, in addition to encapsulating the heating element 30, the thermal conductor 26 also functions as a heat transfer medium to deliver heat from the heat source 24 to the film being sealed. In this manner, the conductor 26 further protects the heating element 30 by serving as a heat sink, which helps to prevent the heating element from overheating.

Accordingly, the thermal conductor 26 preferably has a relatively high degree of thermal conductivity while the thermal insulator 28 has a relatively low degree of thermal conductivity. Thermal conductivity is a measure of the ability of a material to transmit heat, and is defined as the rate at which heat will flow through the material. The lower the thermal conductivity of a material is, the better the material is at resisting the flow of heat therethrough. Conversely, the higher the conductivity, the better the material is at allowing heat to flow through it. One common unit of measurement is Btu in./ft.$^2$ hour ° F., which is the rate of heat flow, in BTU's per hour, through a square foot of material one inch thick whose surfaces have a temperature differential of 1° F. For reference, water has a conductivity of 4 Btu in./ft.$^2$ hour ° F., fiberglass insulation is approximately 0.04, and stainless steel is 111.

The specific thermal conductivity of the materials chosen for the thermal conductor 26 and thermal insulator 28 is not critical; however, it is preferred that the thermal conductivity of the material chosen for the conductor 26 is higher than that of the material selected for the insulator 28 such that the thermal conductor 26 has a higher degree of thermal conductivity than the thermal insulator 28.

Preferably, the thermal conductor 26 will have a relatively high degree of thermal conductivity in order to transfer heat as efficiently as possible, e.g., greater than about 1 Btu in./ft.$^2$ hour ° F. In addition, the material employed for the thermal conductor 26 preferably also has a sufficiently low degree of electrical conductivity that the electrical current sent through the supply/return wires 34$a$, $b$ will pass through the heating element 30, and not through the thermal conductor 26. The material used for the thermal conductor 26 will ideally also have a sufficiently high operating temperature to withstand the heat produced by the heat source 24. A further factor in the selection of materials for thermal conductor 26 is abrasion resistance. As described in further detail below, when the heat-seal device 12 is in operation, the surface 44 of the conductor 26 is in sliding contact with the film being sealed, and sufficient abrasion resistance to provide a reasonable life span is thus a desirable feature.

A number of suitable compounds for thermal conductor 26 are available, including high-temperature epoxies and ceramic cements. Many epoxies have a maximum temperature rating of around 500° F., while ceramic cements have maximum temperature ratings ranging from about 1500° to 4000° F. A specific material that was found to work well as a thermal conductor is an alumina ceramic cement sold by Cotronics Corporation of Brooklyn, N.Y. under the tradename Resbond 989FS. This alumina ceramic cement has a temperature rating of 3000° F., a thermal conductivity of 15 Btu in./ft.$^2$ hour ° F., good abrasion properties, and a relatively low degree of electrical conductivity. Other suitable materials include zircon-based cements, and aluminum-nitride-filled ceramic potting compounds.

The thermal insulator 28 preferably has a relatively low degree of thermal conductivity, i.e., in comparison to the thermal conductor 26, in order to insulate the cartridge housing 18 from the heat generated by the heat source 24, and to direct such heat into the film being sealed. For example, the thermal conductivity of the material from which the thermal insulator 28 is constructed is preferably less than about 5 Btu in./ft.$^2$ hour ° F. Many suitable materials exist, e.g., ceramics, such as zirconia and alumina silicate, high temperature plastics such as poly ether ether keytone (PEEK) or polyphenylsulfone, glass, glass ceramics, etc. A specific example of a suitable thermal insulating material is a general purpose alumina silicate ceramic, such as Grade GCGW-5110, manufactured by Graphtek, LLC, which has a thermal conductivity of 0.003 Btu in./ft.$^2$ hour ° F.

As noted above, the thermal insulator 28 substantially surrounds the thermal conductor 26, but leaves a surface portion 44 thereof exposed. In this manner, the exposed surface portion 44 provides a heat-seal contact surface, which is adapted to be brought into contact with a material to be sealed, e.g., a pair of juxtaposed film plies. The exposed portion 44 may be adapted in this regard, e.g, by applying thereto a surface finish, which both smoothes and rounds the exposed portion so that it may be brought into sliding contact with film material to be sealed with minimal abrasion thereto and/or frictional resistance therewith. If desired, the entire contact surface 46 of the heat-seal device 12 may be rounded and smoothed in this manner.

The heat source 24 is preferably encapsulated by thermal conductor 26 such that substantially no portion of the heat-source, and particularly the heating element 30 thereof, is exposed at the exposed/heat-seal contact surface 44. In this manner, the heat source 24 does not come into direct contact with the material to be sealed. Instead, the heat generated by the heat source 24 is transferred into the thermal conductor 26. By substantially surrounding the thermal conductor 26 with the thermal insulator 28 as described above, a significant portion of the heat transferred into the thermal conductor 26 by the heat source 24 may be transferred through the thermal conductor 26 and into a material to be sealed via the exposed/heat-seal contact surface 44.

As may be appreciated, the foregoing configuration in accordance with the present invention results in a highly efficient transfer of the energy supplied to heat source 24, e.g., electrical energy via wires 34$a$, $b$, into the film or other material to be sealed. In addition, this configuration avoids the above-noted difficulties associated with conventional heat-sealing devices, which generally employ direct contact between the film and the heat-source. That is, by encapsulating the heat-source, the problems of 'ribbon cutting' of the film and shortened service life of the heating element are avoided.

In accordance with another aspect of the present invention, heat-seal device 12 may further include a temperature-measuring device 48, at least a portion of which is encapsulated with heat source 24 in thermal conductor 26, as shown in FIG. 8. In the illustrated embodiment, a thermocouple is used as the temperature-measuring device 48, which includes two wires 50, 52 of dissimilar metals welded together at a junction 54. As is well known to those of ordinary skill in the art, thermocouples operate based on the principle that when a junction of two dissimilar metals is heated, a voltage is created that corresponds to the temperature. Typically, the junction size is 1.5 times the wire diameter. For instance, if the wires 50, 52 are both 0.005 inches in diameter, the junction 54 will be 0.0075 inches in diameter.

There are numerous, commercially-available thermocouple types using various materials which are chosen for their temperature ranges and response time. Almost any type will work in heat-seal device 12, e.g., a 'type J' thermocouple comprising, as the two dissimilar metals, iron and constantan, with a temperature range of 32-1382° F. In most cases, the temperature needed to seal two polymeric film plies together is in the range of 250-400° F. The output of a type J thermocouple in this temperature range is approximately 6 to 8 millivolts. Since this output is small, the controller 16 will preferably include an instrument amplifier that will increase and filter the signal from the thermocouple.

As shown in FIG. 8, both the heating element 30 of heat source 24 and the thermocouple junction 54 of temperature-measuring device 48 may be encapsulated in the thermal conductor 26, which is surrounded by the thermal insulator 28 in the cartridge housing 18. As shown, the heating element 30 and thermocouple junction 54 may be physically separated from each other within the thermal conductor 26. When the thermal conductor 26 is formed from a material having a relatively low degree of electrical conductivity, this arrangement results in the heating element 30 and thermocouple junction 54 being electrically insulated from one another, which makes for a clearer output signal from the thermocouple.

The encapsulated portion of the temperature-measuring device 48 may be positioned between the heat source 24 and heat-seal contact surface 44. For example, as also shown in FIG. 8, the thermocouple junction 54 can be placed between the heating element 30 and the heat-seal contact surface 44. This configuration has been found to result in a high degree of accuracy in the measurement of the temperature of the thermal conductor 26 at the surface 44. The encapsulation of the junction 54 and heating element 30 in the thermal conductor 26 ensures that such configuration will be maintained, e.g., will not be disturbed due to movement of the film against the heat-seal device 12. Alternatively, the encapsulated portion of the temperature-measuring device 48, e.g., the junction 54 thereof when device 48 is a thermocouple, may be positioned beneath or beside the heat source 24 within the thermal conductor 26.

Figure 5:
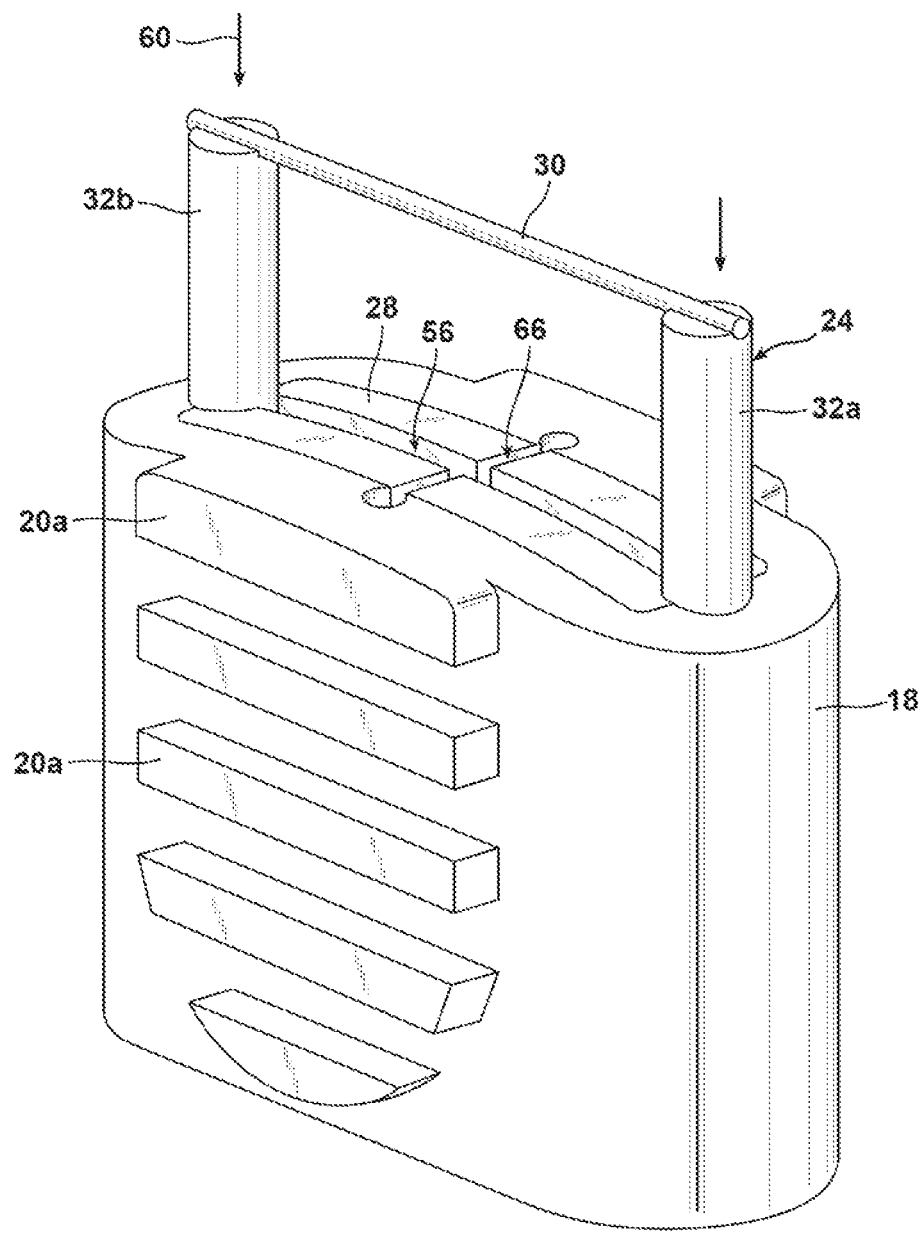
FIG. 5 is a perspective view of a step in the assembly process for heat-seal device 12, in which the heat-source 24 is inserted into the housing 18 of the device.
Figure 6:
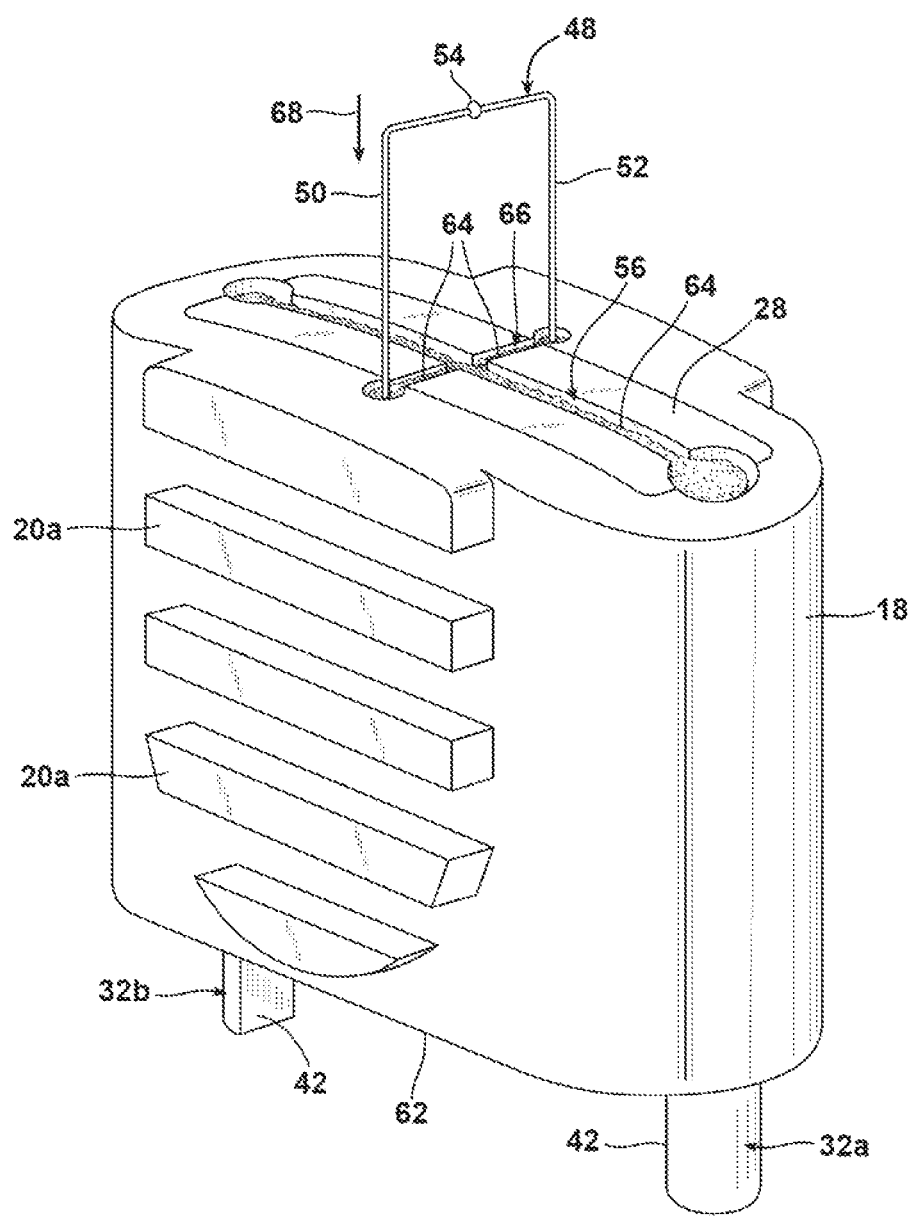
FIG. 6 is a perspective view of a step in the assembly process for heat-seal device 12, in which temperature-measuring device 48 is inserted into the housing 18 of the device.
Figure 7:
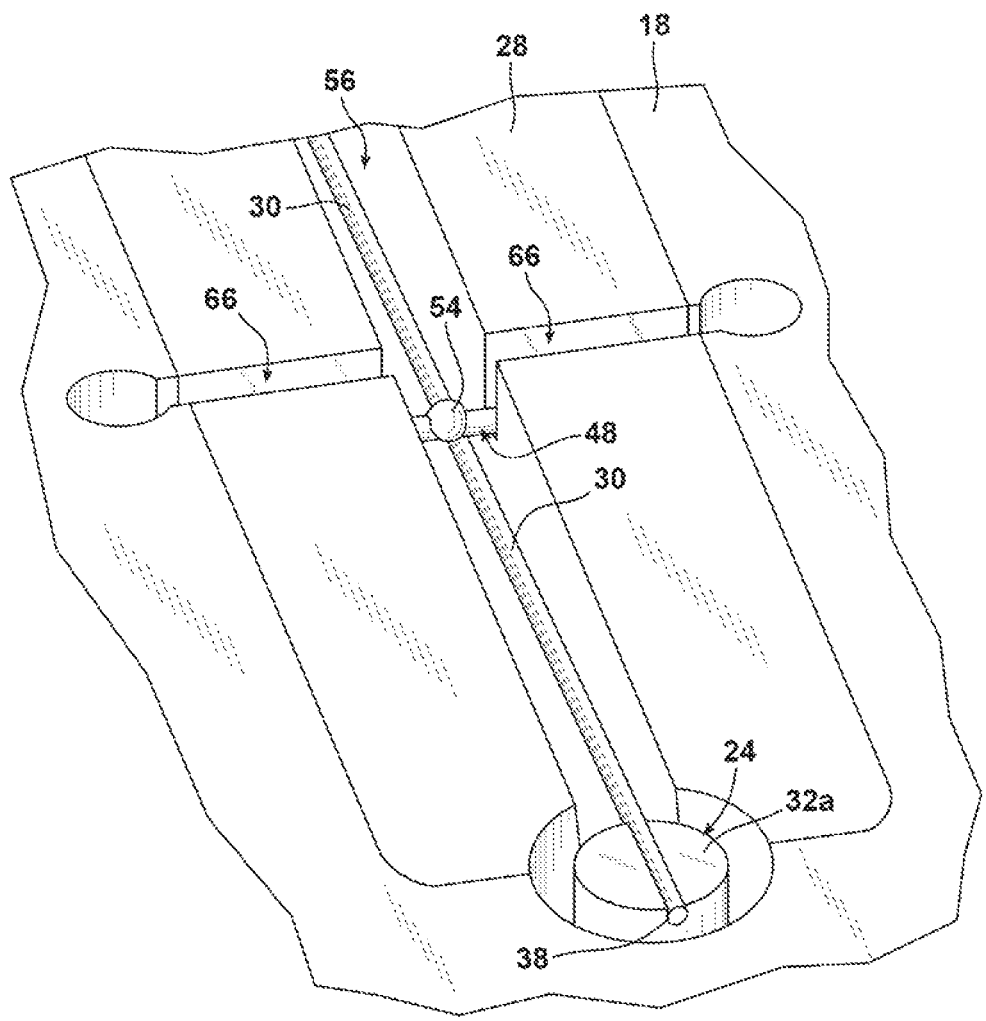
FIG. 7 is a partial, perspective view of the device as shown in FIG. 6, following the insertion of the temperature-measuring device 48.

Referring now to FIGS. 5-7, a method for assembling the heat-seal device 12 will be described. FIG. 5 shows the beginning of the assembly process, with thermal insulator 28 having already been inserted into cartridge housing 18. As shown, the thermal insulator 28 has an open channel 56 to accommodate the heat source 24.

The thermal conductor 26 may be provided in the form of an uncured liquid or paste, which may subsequently be cured into a solid. For example, alumina ceramic cement, e.g., Resbond 989FS, has the ability to flow when in uncured/liquid form, and then accept a smooth finish when in cured/solid form. Curing may be accomplished by simply allowing the material to air dry.

Accordingly, a small quantity of uncured thermal conducting material may first be poured or otherwise placed into the channel 56, e.g., in an amount sufficient to cover the bottom 58 of the channel 56 (FIG. 8). The heat source 24 is then inserted in the direction of arrows 60 into channel 56 (FIG. 5), and pressed down into the channel until the second ends 42 of the contact posts 32a, b protrude from the bottom 62 of the housing 18 (FIG. 3) and the heating element 30 is buried into the thermal conducting material placed at the bottom 58 of the channel 56.

In FIG. 6, the heat source 24 has been fully installed, with only the second ends 42 of the contact posts 32a, b visible, as extending from the bottom 62 of the housing 18. Additional thermal conducting material, indicated at 64, is then added into the channel 56, on top of the heating element 30 to bury the element 30.

FIG. 6 also depicts the installation of the temperature-measuring device 48. In the presently-illustrated embodiment, thermal insulator 28 may include a second channel 66 to accommodate the temperature-measuring device 48. Second channel 66 may be disposed at an angle relative to the channel 56, e.g., substantially transverse as shown. Both channels 56 and 66 may extend beyond thermal insulator 28 as needed, e.g., into housing 18 as shown.

The temperature-measuring device 48 may be inserted into the second channel 66 as shown, i.e., by moving the device 48 into the channel 66 in the direction of arrow 68, such that it is embedded into the thermal conducting material 64. As a result, the temperature-measuring device 48 and heat source 24 will have the respective positions shown in FIG. 7 (the thermal conducting material 64 is not shown in FIG. 7 for clarity).

After installation of the temperature-measuring device 48, additional thermal conducting material 64 is added on top of the device 48, so that the material 64 covers the device 48 and fills the channels 56, 66. If desired, the thermal conducting material 64 may be mounded above the top of the channels 56, 66 to insure complete fill. The conducting material 64 may then be allowed to cure completely until hardened (with the rate and conditions of the cure depending upon the specific material selected), thereby resulting in the thermal conducting material 64 transforming into thermal conductor 26. Any excess material may be removed by sanding, and the heat-seal contact surface 44 may be alternatively or additionally polished to provide a desired degree of smoothness, e.g., to minimize the coefficient of friction between the surface 44 and the films to be sealed.

The result of the foregoing assembly process is the heat-seal device 12 as shown in FIG. 2.

Referring back to FIG. 1, it may be seen that the temperature-measuring device 48 may be brought into electrical communication with controller 16 in the same manner as is heat source 24, i.e., via support member 14. Support member 14 may thus be configured such that sensing wire 70a extends through the support member, and terminates at contact pin 72a, while sensing wire 70b extends through the support member, and terminates at contact pin 72b as shown. Within heat-seal device 12, thermocouple wire 50 terminates at, and is electrically connected to, thermocouple contact 74, which, as shown in FIG. 3, is positioned at the bottom 62 of housing 18, e.g., as a step in the assembly process for heat-seal device 12. Similarly, thermocouple wire 52 terminates at, and is electrically connected to, thermocouple contact 76. In this embodiment, the thermocouple contacts 74, 76 are included to ensure good electrical communication between the relatively small-diameter thermocouple wires 50, 52 and the sensing wires 70a, b, by electrically connecting the thermocouple wires 50, 52 to the relatively large contact surfaces 78, 80, against which the contact pins 72a, b abut when the heat-seal device 12 is inserted into support member 14 as shown in FIG. 1.

Figure 9:
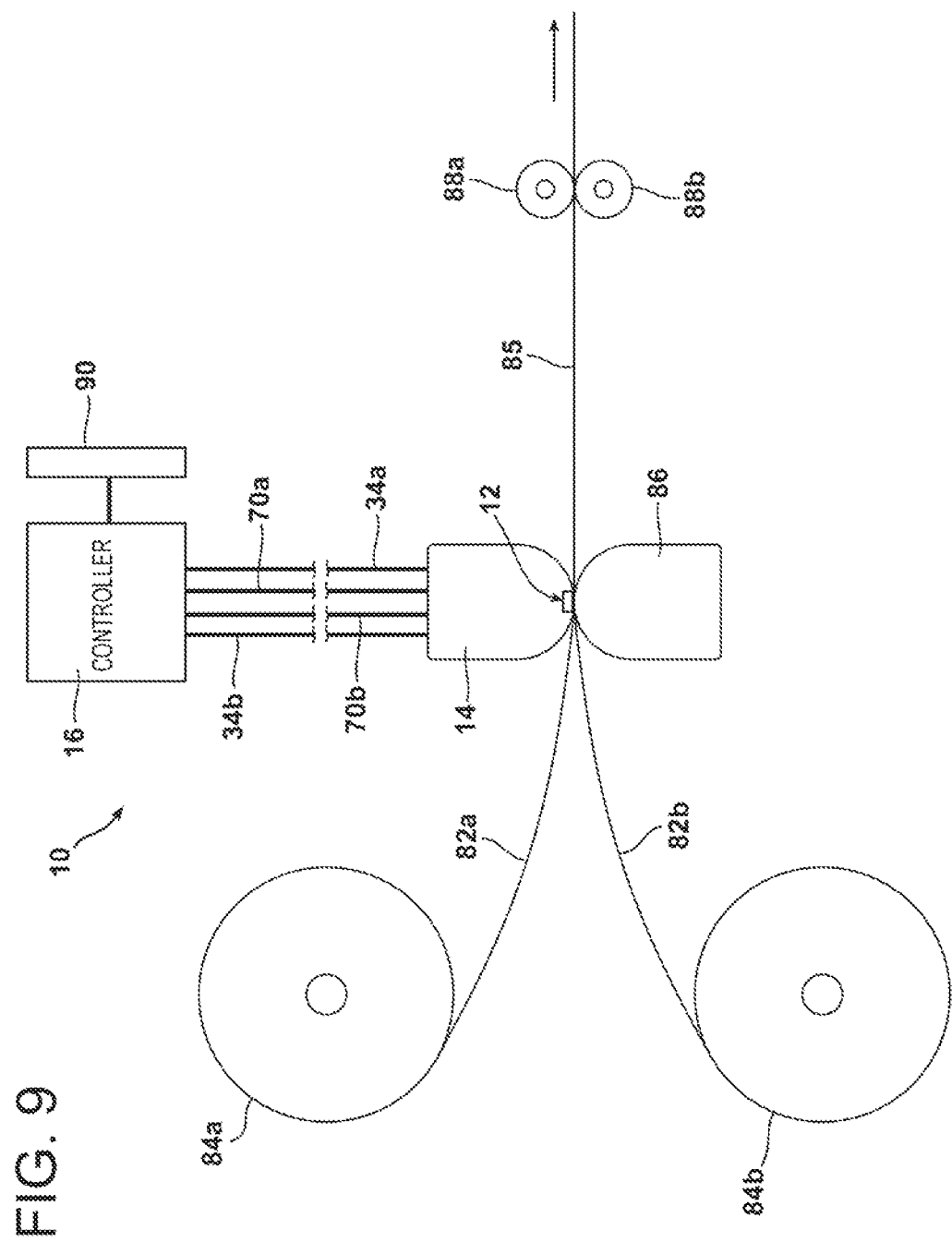
FIG. 9 is a schematic view of a heat-seal process employing system 10 as shown in FIG. 1.

Referring now to FIG. 9, a heat-sealing method in accordance with the present invention will be described. FIG. 9 illustrates system 10, as shown in FIG. 1, in a process for sealing a web of material, e.g., for sealing together two juxtaposed film plies 82a, b via a continuous longitudinal seal, e.g., at juxtaposed edges of the film plies to thereby form an inflatable or fillable packaging material 85 with a closed longitudinal edge (closed edge not shown). As is conventional, film plies 82a, b may be supplied from separate film rolls 84a, b. Sealing may be facilitated by providing a backing member 86, which may be movable relative to heat-seal device 12, or simply biased against the heat-seal device, such that film plies 82a, b may be compressed between device 12 and member 86 during sealing as shown.

The system may further include a conveyance mechanism for conveying a web of material to be sealed, e.g., juxtaposed film plies 82a, b, against the heat-seal contact surface 44 of heat-seal device 12, wherein the conveyance mechanism is adapted to convey the web at varying speeds. As shown, the conveyance mechanism may be embodied by a pair of driven, counter-rotating nip rollers 88a, b. As an alternative, the conveyance mechanism may be embodied by a single drive roller, which is used in place of backing member 86 to both drive the conveyance of the web and compress the web against the heat-seal device 12.

In its most basic form, the method illustrated in FIG. 9 includes the steps of:

a. providing heat-seal device 12;

b. causing the heat source 24 to produce heat; and c. bringing the heat-seal contact surface 44 into contact with the material to be sealed, i.e., film ply 82a, which is juxtaposed with film ply 82b as shown. In this manner, as explained above, the heat produced by heat source 24 transfers through the thermal conductor 26 and into the film plies 82a, b via contact surface 44 of heat-seal device 12.

When the heat-seal device 12 includes temperature-measuring device 48, the foregoing method would include the further step of measuring the temperature within the thermal conductor 26. Such method may be carried out by system 10, as shown in FIGS. 1 and 9, wherein controller 16 is in operative communication with both heat source 24 and with temperature-measuring device 48, i.e., via respective wires 34a, b and 70a, b as described above. Controller 16 may thus be adapted, e.g., programmed, to:

1) receive input from temperature-measuring device 48, which is indicative of the temperature of thermal conductor 26, and 2) send output to heat source 24, which causes the heat source to produce more heat, less heat, or an unchanged amount of heat, e.g., depending upon a selected/target temperature that is provided to, or calculated by, controller 16.

In this manner, controller 16 determines the temperature of the thermal conductor, which will generally vary within a temperature range that is centered on a selected temperature, which becomes a target temperature that the controller tries to maintain. Controller 16 May thus include an operator interface 90 (FIG. 9), e.g., a control panel, which allows an operator to select a temperature for the thermal conductor 26. Alternatively, controller 16 may be programmed with a mathematical algorithm that calculates the selected/target temperature, based on various factors such as film speed, film type, etc.

As may be appreciated, the controller 16, temperature-measuring device 48, and heat source 24 together form a temperature-control feedback loop, in which the controller will continuously vary the power input supplied to the heat source, based on temperature feedback provided by the temperature-measuring device, in order to maintain the temperature of the thermal conductor 26 as closely as possible to the operator-selected or controller-calculated temperature. As with all such temperature-control feedback loops, there will generally be an inherent off-set between the selected temperature and the actual temperature, with the controller 16 continually 'driving' the actual, sensed temperature toward the set-point temperature, in response to changes in the actual temperature due to operational changes during the sealing process. Controller 16 will thus maintain the thermal conductor 26 at a temperature that falls within a range of the selected temperature.

Many types of controllers are suitable for use as controller 16. Controller 16 may be an electronic controller, such as a printed circuit assembly containing a micro controller unit (MCU), which stores pre-programmed operating codes; a programmable logic controller (PLC); a personal computer (PC); or other such control device which allows the temperature of the thermal conductor 26 to be controlled via local control, e.g., via operator interface 90; remote control; pre-programmed control, etc.

Various modes of control may be employed by controller 16, including proportional, derivative, integral, and combinations thereof, e.g., PID (proportional-integral-derivative) control, to achieve a desired degree of accuracy in the control of the temperature of thermal conductor 26, e.g., a desired maximum degree of off-set between the set and actual temperature. The electrical power output to heat source 24 from controller 16 may be regulated via analog power control or digital power control, e.g., pulse width modulated power control.

In some embodiments, the film web to be sealed is conveyed, i.e., driven, through the system at variable speeds. See, e.g., the foam-in-place system disclosed in U.S. Pat. No. 7,607,911, the disclosure of which is hereby incorporated entirely herein by reference thereto. In such systems, as the film drive speed is increased, the time of contact between the sealing surface and the film becomes shorter. As the contact time decreases in this manner, the temperature of the sealing surface may be raised in order to ensure that good seals continue to be made, i.e., in order to put sufficient heat into the film to ensure that its temperature remains above the melting point thereof. Conversely, when the film speed is decreased, the contact time between the sealing surface and the film increases. In this case, the temperature of the sealing surface may be lowered to ensure that the sealing surface does not put so much heat into the film that it melts therethrough. Accordingly, controller 16 may be adapted, e.g., programmed, to change the temperature of the thermal conductor 26 based on changes in the speed at which the film web is conveyed.

As an example, the heat-seal device 12 was used as a longitudinal sealing device in the foam-in-place apparatus disclosed in the above-referenced U.S. Pat. No. 7,607,911, by mounting the device 12 on shaft 48 of the '911 apparatus such that the heat-seal contact surface 44 of the device 12 was urged into contact with drive roller 40 of the '911 apparatus near an end of the drive roller such that the unsealed longitudinal edges of a pair of juxtaposed film plies were sealed together when conveyed between the contact surface 44 of the device 12 and drive roller 40 of the '911 apparatus. The film plies comprised polyethylene and had a thickness of about 0.75 mil.

The drive roller 40 of the '911 apparatus was driven by a gear motor that included an encoder. A controller, similar to controller 16 as described above, was in communication with the encoder and gear motor, such that the controller monitored the film drive speed (based on input from the encoder) and drove it at a desired rate in accordance with the '911 patent. The encoder produced 3900 counts per inch of film travel. Thus, for example, if the controller read 3900 counts per second, this meant that the film was being driven at 1 inch per second.

The controller may be programmed to simply increase the seal temperature by a predetermined amount in response to a given speed increase, e.g., a temperature increase of 10° F. for each 1 inch/second speed increase, and visa versa. Alternatively, optimal 'seal-temperature vs. film-speed' values may be determined experimentally, and then programmed into the controller. The latter was accomplished by driving the film plies through the '911 apparatus at various speeds throughout the speed range of the gear motor, and determining the lowest and highest temperatures at each speed at which a good seal was made. A "good seal" at the lowest temperature was the point at which the film plies exhibited some degree of stretch prior to the seal breaking when the film plies were pulled apart, indicating that the seal was strong enough to withstand at least some amount of applied tensile force. A "good seal" at the high temperature was the point just below the temperature when ribbon cutting began.

Table 1 below is a summary of the resultant data:

TABLE 1

| Film drive speed (inch/min.) | Low temp for good seal (° F.) | High temp for good seal (° F.) | Temp midpoint seal (° F.) | Calculated temp: Y = mX + b |
|---|---|---|---|---|
| 1 | 200 | 230 | 215 | 218 |
| 2 | 220 | 260 | 240 | 236 |
| 3 | 220 | 280 | 250 | 253 |
| 4 | 230 | 310 | 270 | 270 |
| 5 | 240 | 350 | 295 | 288 |
| 6 | 240 | 360 | 300 | 305 |
| 7 | 260 | 390 | 325 | 323 |
| 8 | 260 | 410 | 335 | 340 |
| 9 | 290 | 430 | 360 | 357 |
| 10 | 300 | 450 | 375 | 375 |

The film plies were driven from 1 to 10 inches/minute in increments of 1 inch/minute. The temperature values shown in Table 1 were obtained experimentally at each speed. To determine the low temperature for a good seal, the seal temperature was lowered until the seal failed. The temperature was then raised until ribbon cutting occurred to determine the high temperature for a good seal. The values shown in Table 1 are the average results of numerous seal tests. The temperature midpoint is the value midway between the low and high values. This midpoint value may be used by the controller to determine the target temperature for each speed value since it offers the largest range to account for inconsistencies in the operation of the apparatus.

There are several ways that the foregoing data can be used by the controller to determine the target temperature for the heat-seal device 12. In one embodiment, the data from Table 1 or the like may be programmed into the controller, which uses the data to select the proper temperature value, e.g., the temperature midpoint, based on the selected/detected film drive speed. For instance, if the film drive speed is 5 inches/minute, the corresponding midpoint heat-seal temperature is 295° F.

In an alternative embodiment, a liner regression formula may be used to determine the target temperature, given that the values in Table 1 represent a substantially straight line. Thus, the formula $$Y=mX+b$$

may be used by the controller, where "Y" is the target temperature, "m" is the slope, "X" is the drive speed, and "b" is the Y intercept. In a situation where the speed vs. temperature plot is not linear, a higher order equation can be used. For the data set forth in Table 1, the slope is 1.742 and the intercept is 200.67. These values may be used by the controller to calculate target temperature as a result of film drive speed. The film drive speed may be determined by the controller based on feedback from the gear motor encoder. The last column in Table 1 above shows the target temperature as calculated in this manner.

Accordingly, the controller may monitor and/or control the film drive speed, and continuously calculate and update the target temperature based on the drive speed. Thus, as the drive speed changes, so does the temperature of the seal element. When the controller both monitors and controls the drive speed it can, as an alternative, use its target drive speed rather than measured drive speed for temperature calculations.

The controller may also be programmed to anticipate changes in drive speed and, therefore, temperature, for those embodiments in which the controller determines drive speed, given that the controller will thus "know" when a speed change will occur, and what the next drive speed and target temperature will be. Such anticipation can be used during a cycle whenever the drive speed changes. If, for instance, the drive speed increases from 2 inches/minute to 8 inches/minute, the controller can take the heating element 30 to the requisite target temperature, e.g., increase the temperature from 236° F. to 340° F., at a time prior to changing speeds, which may help to maintain the consistency and integrity of the seal, e.g., by not allowing unsealed gaps to form immediately following the speed increase. Conversely, the controller can lower the target temperature prior to slowing or stopping the film drive. This may prevent the heat-seal device 12 from burning through the film due to having too much heat for the slower speed.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A heat-seal system for sealing together two juxtaposed film plies via a continuous longitudinal seal, comprising:
    a. a heat-seal device in the form of a replaceable cartridge, comprising
        1) a heat source capable of producing heat,
        2) a thermal conductor, which encapsulates at least a portion of said heat source and is capable of assuming a temperature that corresponds, at least in part, to the heat produced by said heat source, and
        3) a thermal insulator, which substantially surrounds said thermal conductor but leaves a portion thereof exposed, said exposed portion of said thermal conductor providing a heat-seal contact surface, which is adapted to be brought into sliding contact with the juxtaposed film plies;
    b. a conveyance mechanism for conveying the film plies against said heat-seal contact surface of said heat-seal device, said conveyance mechanism being adapted to convey the film plies at varying speeds;
    c. a support member to which said heat-seal device is removably affixed, said support member bringing the heat-seal contact surface of said heat-seal device into sliding contact with said juxtaposed film plies as said conveyance mechanism conveys said film plies against said heat-seal contact surface, thereby sealing said film plies together in the form of a continuous longitudinal seal;
    d. a temperature-measuring device, at least a portion of which is encapsulated with said heat source in said thermal conductor; and
    e. a controller in operative communication with said heat source and with said temperature-measuring device, said controller adapted to
        1) receive input from said temperature-measuring device, which is indicative of the temperature of said thermal conductor, and
        2) send output to said heat source, which causes said heat source to produce more heat, less heat, or an unchanged amount of heat,
    whereby, said controller determines the temperature of said thermal conductor, and is adapted to change said temperature based on changes in the speed at which the film plies are conveyed.

2. The system of claim 1, wherein said heat-seal device is contained within a cartridge housing having opposing grip members to facilitate manual grasping of said housing.

3. The system of claim 1, wherein said thermal conductor is selected from the group consisting of high-temperature epoxies, ceramic cements, zircon-based cements, and aluminum-nitride-filled ceramic potting compounds.

4. A method for sealing together two juxtaposed film plies via a continuous longitudinal seal, comprising:
   a. providing a heat-seal device in the form of a replaceable cartridge, which is removably affixed to a support member, said heat seal device comprising
      1) a heat source capable of producing heat,
      2) a thermal conductor, which encapsulates at least a portion of said heat source and is capable of assuming a temperature that corresponds, at least in part, to the heat produced by said heat source, and
      3) a thermal insulator, which substantially surrounds said thermal conductor but leaves a portion thereof exposed, said exposed portion of said thermal conductor providing a heat-seal contact surface, which is adapted to be brought into sliding contact with the juxtaposed film plies;
   b. conveying the juxtaposed film plies against said heat-seal contact surface of said heat-seal device such that said heat-seal contact surface is in sliding contact with said juxtaposed film plies to seal said film plies together in the form of a continuous longitudinal seal;
   c. measuring the temperature within said thermal conductor with a temperature-measuring device; and
   d. controlling the temperature of said thermal conductor with a controller, which is in operative communication with said heat source and with said temperature-measuring device, said controller
      1) receiving input from said temperature-measuring device, which is indicative of the measured temperature of said thermal conductor, and
      2) sending output to said heat source, which causes said heat source to produce more heat, less heat, or an unchanged amount of heat,
   whereby, said thermal conductor is maintained at a temperature that falls within a range of a selected temperature.

5. The method of claim 4, further comprising the steps of:
   conveying the film plies at varying speeds; and
   changing the temperature of said thermal conductor based on changes in the speed at which the film plies are conveyed.

6. The method of claim 4, wherein
   said method comprises the further step of removing and replacing said heat-seal device.

* * * * *